Patented Aug. 9, 1927.

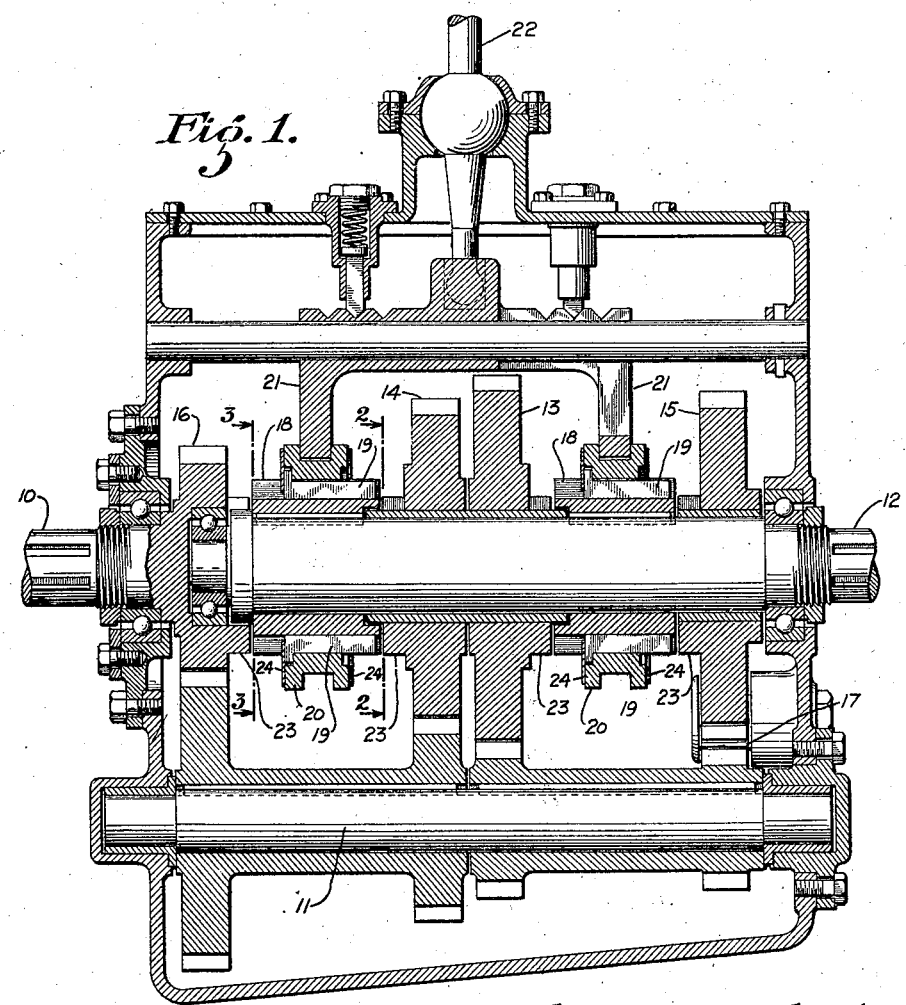

1,638,590

UNITED STATES PATENT OFFICE.

PHILIP MACKENZIE, OF SAN FRANCISCO, CALIFORNIA.

CLUTCH MECHANISM FOR A CONSTANT-MESH GEAR TRANSMISSION.

Application filed August 14, 1924. Serial No. 731,944.

This invention relates to change-speed transmission mechanisms for automotive vehicles, and more particularly to a clutch mechanism for the type of transmission wherein the gears are constantly in mesh.

Prior structures of this nature, so far as known to me, have been subject to defects such as liability to jam or break. It is the object of the present invention to simplify and improve the construction and operation of a transmission mechanism of the type mentioned, and to provide a strong and rugged mechanism which will not be liable to jam or break, and which can be depended upon to effect a change of speed under difficult circumstances, as, for instance, when the clutch is engaged or when travelling down hill, when it is desired to pass from the higher to a lower gear.

One form which my invention may assume is exemplified in the following description and illustrated in the accompanying drawings, in which—

Fig. 1 shows a vertical central sectional view of a transmission mechanism embodying my invention;

Fig. 2 shows a section taken on the line 2—2 of Fig. 1;

Fig. 3 shows a section taken on the line 3—3 of Fig. 1;

Fig. 4 shows a section taken on the line 4—4 of Fig. 3.

Referring in detail to the accompanying drawings, and particularly to Figs. 1 and 2, I show a transmission mechanism having a drive shaft 10, and a counter-shaft 11 parallel therewith. A driven shaft 12 is aligned with the drive shaft, and is adapted to be directly connected therewith for high-speed drive. The driven shaft carries a low-speed gear 13, an intermediate speed gear 14 and a reverse gear 15, all loosely mounted thereon. A high-speed gear 16 is fixed on the drive shaft adjacent the driven shaft. Each of the gears above mentioned is in constant mesh with a gear on the counter-shaft 11, except that the reverse gear 15 meshes with an idler gear 17, which in turn meshes with a gear on the counter-shaft to bring about the desired reverse drive. The low speed gear 13, the intermediate speed gear 14 and the reverse gear 15, while being loosely mounted on the shaft, may be held from axial movement in any particular manner, such as shouldering them on the bushings or shrouding the teeth, these being old mechanical expedients for the purpose.

Between the high and intermediate speed gears, and between the low and reverse gears on the driven shaft, is a collar 18, fixed to said shaft. Each of these collars is provided with key-ways to receive a number of sliding keys 19. As here shown there are four such sliding keys on each collar, two pointing in one direction and two in the opposite direction. All four keys on each collar are operatively connected with a shifting or collar 20, which latter are manipulated by suitable shifting-forks 21. The shifting-forks 21 may be actuated by a hand lever 22 after the manner of the shifting-forks in the usual sliding gear transmission.

The keys 19 are adapted to co-operate with lugs or teeth 23 formed on the adjacent faces of the gears 13, 14, 15 and 16. There are preferably three such lugs on each gear, equally spaced, and the two pins or keys designed to co-operate therewith are diametrically spaced so that only one key or pin is actually in driving engagement at any particular time. However, by so spacing the lugs and keys I am enabled to obtain a positive and almost instantaneous driving engagement when the keys are shifted. The keys 19, it will be noted, are held normally in projected position in their seats by means of leaf-springs 24 secured to the associated shift-collar 20. When a shift of the keys is made one of said keys will immediately come into driving engagement with one of the lugs on said gear while the other key will engage with the opposite lug and prevent blacklash. Should the second key strike the face of a lug it will simply be retracted against its connected spring, and upon further relative movement between the keys and co-operating gear, this key will quickly come into engagement with the opposite lug on said gear. Once the key is in engagement with the lug on the co-operating gear, transmission of power is imparted after the manner of the ordinary sliding gear transmission, low, intermediate, and reverse being through the counter-shaft, and high gear being a direct drive, at which time a driving key is in engagement with a lug on the gear 16.

Owing to the ease of shifting the driving keys, and the relatively slight movement required to bring about a shift from one speed to another, the present transmission mechanism lends itself ideally to automatic control; that is to say, suitable pre-selecting means may be provided and placed under control of keys, levers or switches placed upon the steering-wheel or instrument-board of the vehicle. These control members may be subject to actuation at any time, and upon a subsequent movement of the clutch pedal the desired shift may be brought about automatically.

What I claim as new and desire to secure by Letters Patent is:

1. A clutching mechanism for a constant mesh gear transmission having a gear rotatably mounted on a shaft and held against axial movement, a clutch collar secured on the shaft contiguous to the gear, a plurality of circumferentially spaced and axially extending clutch members carried by said clutch collar, a shifting collar arranged over said clutch collar and members and relatively associated with the latter, clutch jaws fixed to the adjacent face of the gear into engagement with which said members may be projected by axial movement of said shifting collar, the connection between said members and said shifting collar being yieldable whereby immediate and positive engagement between said members and said jaws may be effected to clutch said gear to said clutch collar.

2. In a transmission of the character described a shaft, a gear revoluble about the shaft and held from axial movement, a clutch collar keyed to the shaft adjacent said gear, axially projecting clutch jaws on the face of said gear adjacent said collar, said collar having a plurality of longitudinal key-ways formed therein, keys slidably mounted in said key-ways whereby they may be projected into engagement with the jaws on said gear, a shifting collar arranged about the clutch collar, a connection between said shifting collar and said keys whereby axial movement of said shifting collar will impart axial movement to the keys, said connection between the shifting collar and keys permitting the latter to yield in one direction whereby engagement of said keys with said clutch jaws may be effected regardless of the relative positions of the keys and jaws.

3. A clutch for use in a constant mesh gear transmission comprising a shaft, a gear revoluble about the shaft and held from axial movement, a clutch collar secured to said shaft contiguous to said gear, axially projecting clutch jaws on the face of the gear adjacent said collar, said collar having longitudinal guide-ways formed therein, clutch members reciprocably mounted in said guide-ways for movement toward and away from the jaws on the gear, a shift collar slidably disposed on said collar and operatively associated with said clutch members to reciprocate them toward and away from said jaws, engaging surfaces between said clutch members and said shift collar whereby movement of the shift collar in a direction away from the jaws will positively shift the clutch members from engagement with the jaws, and spring means forming a connection between the shift collar and the clutch members and capable of transmitting the motion of the shift collar toward the clutch jaws to said clutch members and yieldably maintain said clutch members in engagement with said jaws.

4. A clutch for use in a constant mesh gear transmission comprising a pair of members adapted to rotate about a common axis, axially projecting clutch jaws fixed to one of said members and projecting toward the other, the other member having keyways formed in its exterior surface and extending longitudinally thereof, keys reciprocably mounted in said keyways, a shift member slidably disposed on the last named member, operative connections between said shift member and said keys whereby operation of said shift member in one direction will positively shift said keys, and operation of the shift member in the other direction will yieldably press said keys into engaging position relative to said clutch jaws.

PHILIP MacKENZIE.